No. 677,185. Patented June 25, 1901.
C. G. DINSMORE.
TIRE REMOVING AND REPLACING DEVICE.
(Application filed Feb. 26, 1901.)
(No Model.)
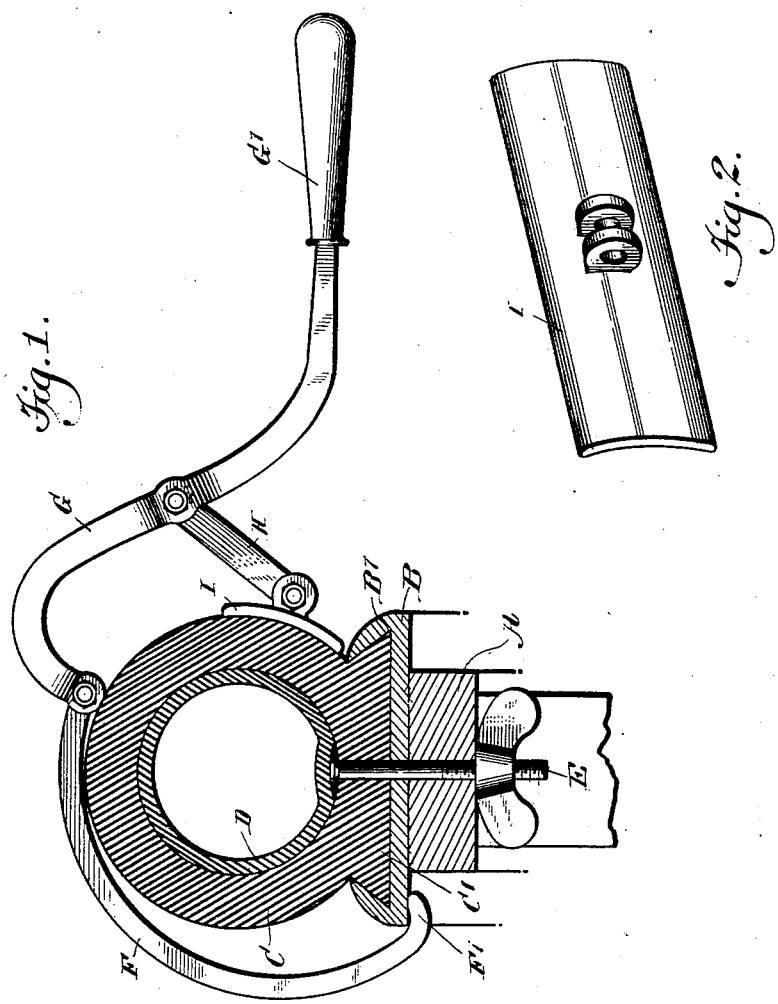
WITNESSES:
INVENTOR
Clarence G. Dinsmore
BY
ATTORNEYS

UNITED STATES PATENT OFFICE.

CLARENCE GRAY DINSMORE, OF STAATSBURG, NEW YORK.

TIRE REMOVING AND REPLACING DEVICE.

SPECIFICATION forming part of Letters Patent No. 677,185, dated June 25, 1901.

Application filed February 26, 1901. Serial No. 48,886. (No model.)

*To all whom it may concern:*

Be it known that I, CLARENCE GRAY DINSMORE, a citizen of the United States, and a resident of Staatsburg, in the county of Dutchess and State of New York, have invented a new and Improved Tire Removing and Replacing Device, of which the following is a full, clear, and exact description.

The invention relates to pneumatic tires; and its object is to provide a new and improved device which is simple and durable in construction, easily manipulated, and arranged to permit the operator to readily remove the tire from the rim for repairing and other purposes and to conveniently replace the tire without danger of injury to the parts of the wheel.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a side elevation of the improvement as applied, the tire and rim being shown in section; and Fig. 2 is a perspective view of the presser-plate.

The wheel on which the device is to be used consists, essentially, of a felly A, carrying a metallic rim B, formed with an annular dovetailed groove B', into which fits a correspondingly-shaped dovetail C' of an outer tube C, containing the usual inner or air tube D, said outer tube C being secured in position by suitable bolts E, extending through the dovetail C', the rim B, and the felly A, as is plainly indicated in Fig. 1. The rim B is adapted to be engaged at one side of the wheel and at the under side of the rim by the end F' of an arm F, curved to extend over the outer tube C, and on the free end of said arm is fulcrumed a hand-lever G, having a handle G', adapted to be taken hold of by the operator. The hand-lever G is pivotally connected by a link H with a presser-plate I, made segmental in cross-section to fit the side of the outer tube C close to one side of the dovetail C', as is plainly shown in Fig. 1.

In order to use the device for removing the tire from the rim B, the operator engages the end F' of the arm F with one side of the rim B and then extends the said arm transversely over the outer tube C to engage the presser-plate I with the side of the outer tube C opposite the side of the wheel on which the end F' engages the rim B. The operator now presses down on the handle G', so that the presser-plate I is moved inward, and in doing so presses the outer tube C to disengage the adjacent bevel of the dovetail C' from the corresponding portion of the dovetailed groove B' to allow of conveniently removing the outer tube C from the rim. It is understood that this operation is repeated around the entire wheel, the elastic material of which the outer tube is formed permitting pressing the tube for the purpose described. When it is desired to replace the tire on the rim B, then the operator engages one side of the dovetail C' with the corresponding side of the dovetail groove and then applies the device, the end F' engaging the rim B at the side engaged by the dovetail C', and then the operator bears down on the handle G' to cause the presser-plate I to compress the tube in a transverse direction to allow of engaging the other side of the dovetail C' with the corresponding part of the dovetail groove B'.

The device is very simple and durable in construction, is composed of but few parts not liable to get out of order, and can be conveniently applied and manipulated to readily remove the tire from the rim or replace the same thereon, as above described.

Having thus fully described my invention, I claim as new and desire to secure by Letters Patent—

1. A device of the class described, comprising an arm adapted to engage with one end one side of a wheel-rim, the arm being fashioned to extend transversely over the tire, a lever pivoted to the other end of the arm and a presser-plate carried by the lever, and adapted to engage the tire at the side opposite the one on which the arm engages the wheel-rim, as set forth.

2. A device of the class described, comprising a curved arm adapted to engage with one end one side of a wheel-rim, a hand-lever fulcrumed on the other end of the arm, a presser-plate for engagement with the tire at the side opposite the one on which the arm engages the wheel-rim, and a link connecting the presser-plate with the hand-lever, as set forth.

In testimony whereof I have signed my name to this specification in the presence of two subscribing witnesses.

CLARENCE GRAY DINSMORE.

Witnesses:
W. H. PARDUE,
W. W. MUCKENFUSS.